3,212,842
CELLULOSE TEXTILE TREATMENT WITH ALKOXY OR PHENOXY ETHYL SULFONIUM SALTS
Frank Harry Burkitt, Manchester, England, assignor to Tootal Broadhurst Lee Company Limited, Manchester, Lancashire, England
No Drawing. Filed Aug. 7, 1962, Ser. No. 215,265
Claims priority, application Great Britain, Aug. 8, 1961, 28,539/61; Oct. 19, 1961, 37,457/61
2 Claims. (Cl. 8—120)

The present invention relates to the treatment of polymeric materials containing at least one reactive —OH or >NH or —SH group in each molecule of the materials such as, for example, cellulosic materials, such as paper, wood or cellulosic film; cellulose derivatives such as cellulose acetate; proteinaceous materials such as wool or animal hides or skins and polyvinyl alcohol. More particularly the invention concerns the treatment of cellulosic textile materials such as fibres, yarns or fabrics including woven or knitted fabrics or non-woven fabrics such as, for example, bonded fibre fabrics of cellulose or cellulose derivatives.

In co-pending U.S. patent application No. 90,621 there is described a process of treating such polymeric materials in the presence of an alkaline or potentially alkaline catalyst with a sulphonium salt which in the presence of the catalyst liberates the following sulphonium cation I with two free valencies:

(I)
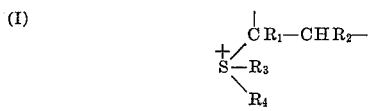

where $R_1$ and $R_2$ may be hydrogen or a lower alkyl group and may be the same or different, and $R_3$ and $R_4$ may be the group ($CR_1$—$CHR_2$—) or an alkyl, substituted alkyl, alicyclic, aralkyl, aromatic or heterocyclic radical and may be the same or different.

It further describes the product formed by the reaction between the polymeric material and the sulphonium salt as having the general formula:

(II)
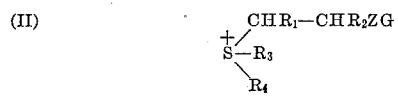

wherein G represents the residue of a polymeric chain, Z represents O, N or S and $R_1$, $R_2$, $R_3$ and $R_4$ have the meanings given above or $R_3$ and/or $R_4$ represent $CHR_1$—$CHR_2ZG$.

It is further stated that substances which may be reacted with the polymeric materials to give products of the general Formula II include (1) β-halo-ethyl salts and (2) esters of mono-, bis- or tris-β-hydroxy ethyl sulphonium salts.

We have now found a further class of substances which, when reacted with polymeric materials, give products which fall within the definition II.

The present invention therefore comprises treating polymeric material containing at least one reactive —OH, >NH or —SH group in each molecule of the material in the presence of an alkaline or potentially alkaline catalyst with a sulphonium salt having the general formula:

(III)
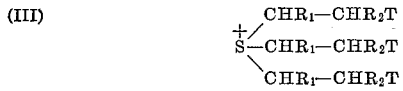

wherein $R_1$ and $R_2$ may be hydrogen or a lower alkyl group and may be the same or different and T represents the radical of an alcohol or phenol.

T may be, for example —$OC_2H_5$, but is preferably the radical of a phenol, for example —$OC_6H_5$. We prefer to treat the polymeric materials with the bis- or tris-forms of such sulphonium salts.

The method of carrying out the process, the alkaline catalyst (which may be a potential alkali) used, and the effect of the treatment, are all as described in the co-pending application above referred to for sulphonium salts especially the β-halo-ethyl salts and the esters of mono-, bis-, or tris-β-hydroxy ethyl sulphonium salts.

Where the proteinaceous material is wool we prefer to treat it with a reducing agent before treating it with the sulphonium ether of the present invention since this makes it more reactive to the sulphonium ether.

The treatment of cellulosic and proteinaceous textile materials according to the present invention may be combined with the treatment of such materials with known crease-resisting agents including resins and such combined treatment may also be carried out as described in the pending application above referred to. Further, as with the sulphonium salts described in the pending application above referred to the sulphonium salts of the present invention having the general Formula III may be used to introduce increased affinity for dyestuffs into polymeric materials or to introduce into such materials other desirable properties.

The mono-, bis-, and tris-sulphonium salts may be prepared, for example, by reacting the corresponding chloro ethyl sulphonium chloride with the sodium derivative of an alcohol or phenol.

The invention will be more clearly understood by reference to the following examples which are purely illustrative:

*Example 1*

17 gms. of sodium phenate was dissolved in 100 ml. of ethanol and this solution was added drop by drop to a solution of 12.9 grams of tris-(β-chloro-ethyl) sulphonium chloride in 100 ml. of phenol. The mixture was cooled with ice during this addition. Sodium chloride was precipitated.

A sample of cotton poplin fabric was dipped in the solution formed by this reaction and dried. It was then dipped in a 10% by weight aqueous caustic soda solution for 2 minutes. It was then washed in water until neutral and then dried.

The treated fabric showed improved minimum-ironing characteristics as compared with the same fabric before treatment.

*Example 2.—Treatment of cotton poplin with methyl bis-(2 phenoxy ethyl) sulphonium iodide*

A cotton poplin fabric was dipped in a 0.25 M solution of methyl bis-(2 phenoxy ethyl) sulphonium iodide. (1 gm. of solid substance in 10 mls. of dimethyl formamide.) The fabric was passed through the bowls of a mangle and was dried at 60° C. It was then placed in 10% w./v. aqueous NaOH for 3 minutes. It was then rinsed in acetic acid and finally washed in water. The treated fabric had greatly improved minimum-ironing characteristics as compared with the fabric before treatment.

*Example 3.—Treatment of wool fabric with methyl bis-(2-phenoxyethyl) sulphonium iodide*

Two samples (samples A and B) of wool flannel fabric were treated with a molar solution of thioglycollic acid for 24 hours, the pH of the solution having been previously adjusted to pH 4.8. The temperature of the solution during the treatment was 30° C.

The samples were washed thoroughly with water and excess removed by squeezing. One sample (sample A) was then impregnated with a 0.3 molar solution of methyl bis-(2-phenoxy ethyl) sulphonium iodide dissolved in dimethyl formamide. Excess of the solution was removed by squeezing between the bowls of a mangle and the sample was impregnated with 10% solution of caustic soda for ¼ minute at room temperature. The sample was then thoroughly rinsed in cold water.

Sample B (control sample) was treated similarly except that the dimethyl formamide contained no sulphonium compound.

The wool fibres of sample A were found to swell less, both during the caustic soda treatment and when immersed subsequently in a solution containing 50% urea, 3% sodium bisulphite at 65° C. for 1 hour, the pH of the solution being adjusted to 7, and the liquor to wool ratio being 50:1, than sample B.

The solubility of sample A in this solution was found to be 15% while the solubility of sample B was 54%.

I claim:

1. Process for improving the minimum ironing characteristics of cellulosic textiles which comprises treating the material in the presence of a member selected from the group consisting of alkaline and potentially alkaline catalysts with a sulphonium salt having the general formula:

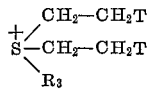

wherein T represents a member selected from the group consisting of ethoxy and phenoxy and $R_3$ represents a member selected from the group consisting of $$-CH_2-CH_2T$$

and alkyl, the positive charge on the sulphur atom being balanced by the negative charge of an anion.

2. The process as in claim 1; wherein said sulphonium salt is tris-($\beta$-phenoxyethyl)sulphonium chloride.

References Cited by the Examiner

UNITED STATES PATENTS

| | | | |
|---|---|---|---|
| 2,204,976 | 6/40 | Von Peski | 260—607 |
| 2,955,016 | 10/60 | Moore | 8—128 |
| 2,971,815 | 2/61 | Bullock. | |

FOREIGN PATENTS 810,437   3/37   France.

OTHER REFERENCES

Stahman et al., J. Org. Chem., vol. II, 1946, pp. 704–718.

NORMAN G. TORCHIN, *Primary Examiner.*